US008809737B2

(12) United States Patent
Åberg et al.

(10) Patent No.: US 8,809,737 B2
(45) Date of Patent: Aug. 19, 2014

(54) METHOD, APPARATUS AND SOFTWARE FOR GAS METAL ARC WELDING WITH A CONTINUOUSLY FED ELECTRODE

(75) Inventors: Per Åberg, Laxå (SE); Thomas Carlsson, Kristinehamn (SE); Hannes Löfgren, Askersund (SE)

(73) Assignee: ESAB AB, Gothenburg (SE)

( * ) Notice: Subject to any disclaimer, the term of this patent is extended or adjusted under 35 U.S.C. 154(b) by 1081 days.

(21) Appl. No.: 10/581,284

(22) PCT Filed: Nov. 8, 2004

(86) PCT No.: PCT/SE2004/001634
§ 371 (c)(1),
(2), (4) Date: Oct. 23, 2006

(87) PCT Pub. No.: WO2005/044502
PCT Pub. Date: May 19, 2005

(65) Prior Publication Data
US 2007/0175876 A1    Aug. 2, 2007

(30) Foreign Application Priority Data
Nov. 7, 2003    (SE) .................................... 0302946

(51) Int. Cl.
*B23K 9/09*    (2006.01)
*B23K 9/10*    (2006.01)

(52) U.S. Cl.
CPC .............. *B23K 9/1056* (2013.01); *B23K 9/093* (2013.01)
USPC .................. 219/130.51; 219/132; 219/137 PS

(58) Field of Classification Search
USPC ................ 219/132, 130.51, 137 PS
See application file for complete search history.

(56) References Cited

U.S. PATENT DOCUMENTS

| 3,989,922 | A | * | 11/1976 | Fahey | 219/130.51 |
| 4,621,183 | A | * | 11/1986 | Takeuchi et al. | 219/121.47 |
| 5,416,299 | A | * | 5/1995 | Tabata et al. | 219/130.51 |
| 5,667,709 | A | | 9/1997 | Ueyama et al. | |
| 5,773,779 | A | * | 6/1998 | Morlock | 219/54 |
| 5,834,732 | A | * | 11/1998 | Innami et al. | 219/130.51 |
| 6,388,233 | B1 | * | 5/2002 | Åberg et al. | 219/137 PS |
| 6,515,259 | B1 | * | 2/2003 | Hsu et al. | 219/130.51 |
| 7,220,941 | B2 | * | 5/2007 | Niedereder et al. | 219/132 |
| 2003/0071024 | A1 | * | 4/2003 | Hsu | 219/130.01 |

FOREIGN PATENT DOCUMENTS

| JP | 7-9149 A | * | 1/1995 |
| JP | 2003126989 A | * | 5/2003 |
| WO | WO 9850190 A1 | * | 11/1998 |
| WO | WO 03022503 A1 | * | 3/2003 |
| WO | WO 03/076114 | | 9/2003 |

OTHER PUBLICATIONS

English translation of JP 07009149 A provided by JPO website.*

* cited by examiner

*Primary Examiner* — Thien S Tran
(74) *Attorney, Agent, or Firm* — Kacvinsky Daisak Bluni PLLC

(57) ABSTRACT

A welding method for gas metal arc welding is provided with continuous electrode feeding and control for short arc welding and/or spray arc welding and also short pulsing in which the control cyclically alternates between short pulsing and short arc or spray arc welding, and time for carrying out the respective control being programmed by a user. A welding power source and software for carrying out this method are also provided.

21 Claims, 5 Drawing Sheets

METHOD, APPARATUS AND SOFTWARE FOR GAS METAL ARC WELDING WITH A CONTINUOUSLY FED ELECTRODE

BACKGROUND OF THE INVENTION

1. Technical Field

The present invention relates to a method and an arrangement for supplementing the pulsed gas metal arc welding process with continuous electrode feeding and material transfer from the electrode to the workpiece essentially in the form of one droplet per pulse without the occurrence of a short circuit, with the object of making vertical welding of V-joints easier, particularly in thick material, especially in aluminium or stainless steel, with improved joint quality and increased productivity. The method consists of causing the welding process to alternate between such pulsed welding and short arc or spray arc welding during a continuous welding run. The apparatus comprises a welding set that supports such a method, which method is called SuperPulse in the following.

2. Background Art

In gas metal arc welding with melting, continually-fed electrode, usually called MIG/MAG welding, the workpiece is heated primarily by the arc. The electrode is heated partly by the welding current flowing through the electrode tip, that is the free end of the electrode between the contact nozzle, where the current transmission to the electrode takes place, and the arc, and partly by the arc itself. The basic control of the welding process consists of obtaining a consumption rate for the electrode that corresponds to the rate of feeding the electrode forward. Additional objects of the control can, for example, be to control the quantity of heat transferred to the workpiece or to minimize spatter.

MIG/MAG welding is carried out in one of three modes. In short arc welding, the material transfer from electrode to workpiece is carried out by large droplets with the occurrence of a short circuit, as shown in outline in FIG. 2. As the process consists of alternating arc and droplet transitions with the occurrence of a short circuit, the average voltage between electrode and workpiece is low and accordingly the heat transmission to the basic material is moderate. When the supplied power is increased, the globular mode is entered, where the material transfer is carried out by a combination of droplets with and without the occurrence of a short circuit. The result is an unstable arc with a lot of spatter and welding fume. Welding in this mode is normally avoided. When sufficiently high power is supplied, the process enters the spray mode, where the material transfer is carried out with small finely-distributed droplets without the occurrence of a short circuit, as shown in FIG. 3. The amount of spatter is clearly lower than with short arc welding. The transmission of heat to the base material is greater and the method is primarily suitable for thicker welded materials. The short arc welding mode and spray arc welding mode are normally controlled by the same type of weld process regulator. The mode that is adopted by the process is determined by the parameters that have been entered in the process regulator.

The third mode is called pulsed welding and involves the use of a considerably more complex process regulator that also actively controls the actual separation of the droplets using a suitable current pulse. Each pulse separates off one droplet and the droplets are sufficiently small for a short circuit not to occur. This method, often called synergic pulsing, has the advantages of the spray mode in the form of little spatter without the disadvantages associated with the great heat transmission.

Pulsed welding has become a very common welding method nowadays with modern rapidly-controlled inverter power sources. A problem with pulsed welding is the requirement for very precise parameter settings. This problem has been partially addressed in recent years by the introduction of double pulsing or pulse-on-pulse capabilities in these power sources. This involves the introduction of a slower pulsing between two different short pulse parameter settings, in addition to the pulsing that has the object of separation of droplets (short pulsing). In this way, a slightly greater tolerance is achieved with regard to the sensitivity of the parameters.

A remaining problem has been welding vertical V-joints in thicker materials, for example, 5-10 mm thick. Great skill has been required in order to weld such joints with acceptable quality. This has applied in particular when welding in aluminium or stainless steel. In order to bridge gaps when welding the root run as well as in order to obtain sufficient penetration and to avoid the weld pool running downwards during welding of sealing runs, the welder has been forced to use a weaving motion and, in this way, control the heat input at any time. This is both tiring and time-consuming and, even with this, the back of the welded joint has usually been concave, which results in poorer strength than if the back had been a convex shape. In order to achieve the required convex shape, some form of backing bar has often had to be used.

OBJECT OF THE INVENTION

The object of the present invention is therefore to provide a method and an arrangement for pulsed welding that completely or partially avoids the problems associated with the known technology. The invention solves the problems in the way described in the characterizing parts of the independent patent claims.

Advantageous embodiments are described in the subordinate claims.

BRIEF DESCRIPTION OF DRAWINGS

The invention will now be described in greater detail by means of embodiments and with reference to the attached drawings, in which.

MODE FOR CARRYING OUT THE INVENTION

Figure 1:
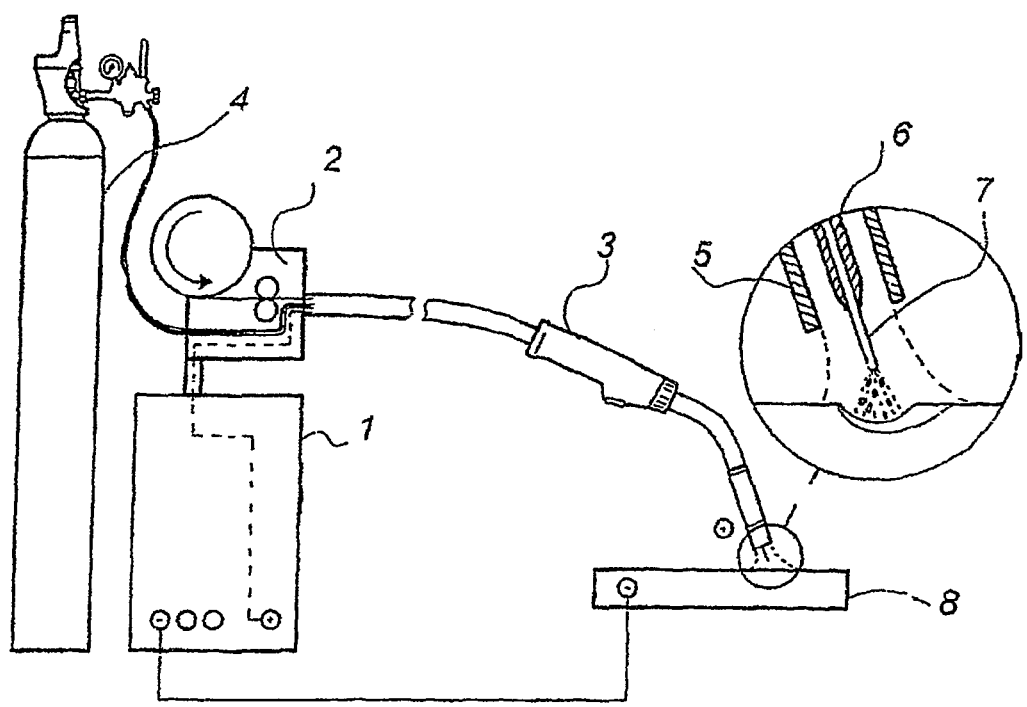
FIG. 1 shows schematically an arrangement for MIG/MAG welding.
Figure 2:
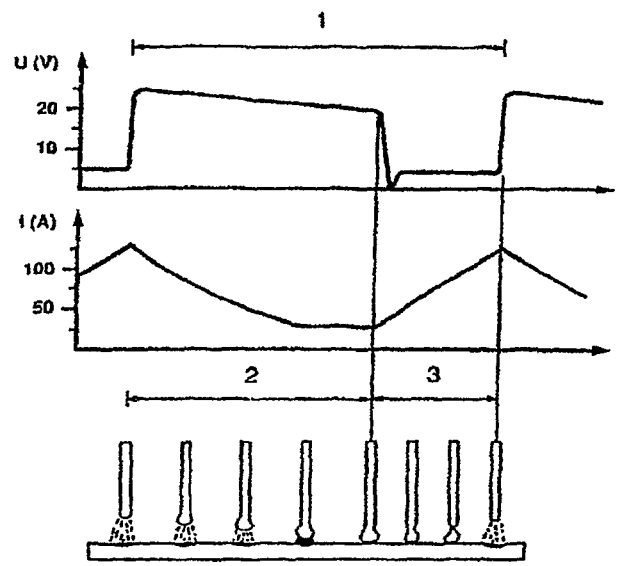
FIG. 2 shows how the current and the voltage are changed when a droplet is transferred between the welding electrode and the workpiece in short arc welding.
Figure 3:
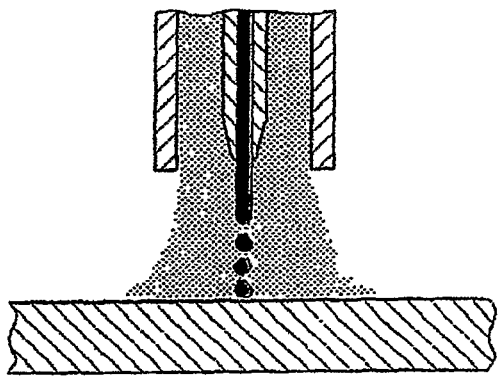
FIG. 3 shows a cross section of the lower part of the welding nozzle and a workpiece when welding in the spray mode.
Figure 4:
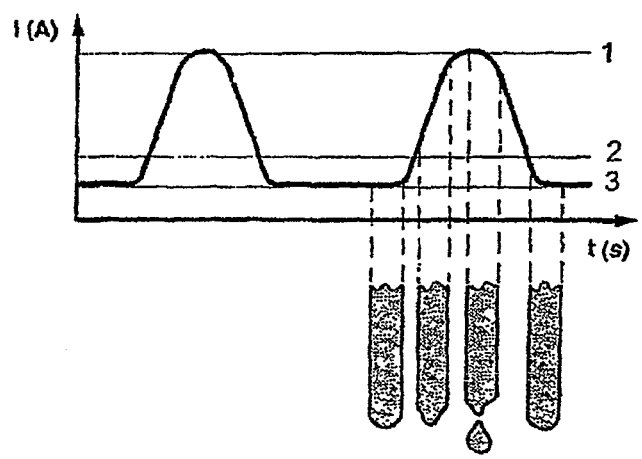
FIG. 4 shows an outline diagram for pulsed welding.

FIG. 1 shows an arrangement for MIG/MAG welding. This arrangement comprises a pulsed welding power source 1 and a wire feed unit 2. The arrangement comprises, in addition, a welding gun and a gas cylinder 4 connected to this. The welding gun comprises a front nozzle comprising an outer tube 5 through which the gas is taken and an inner tube arranged centrally in this tube, which inner tube comprises a contact nozzle 6 through which the electrode 7 is passed. The electrode 7 and the workpiece 8 are connected to the welding power source 1 in the conventional way so that a voltage difference is created between them. The arrangement is controlled in such a way that the material transfer from the electrode to the workpiece is carried out essentially by droplets without the occurrence of a short circuit (FIG. 4). This is carried out by the welding current being periodically increased to a pulse current of such a size and length that the current density in the electrode brings about sufficient electromagnetic forces to separate off one droplet per pulse.

FIG. 4 shows the principle for pulsed welding where the strength of the current increases in pulses, which leads to separation of droplets at the end of the electrode. The current level 1 corresponds to the peak current value for the pulses, the current level 2 corresponds to the average current level and the current level 3 corresponds to a background current level.

Figure 5:
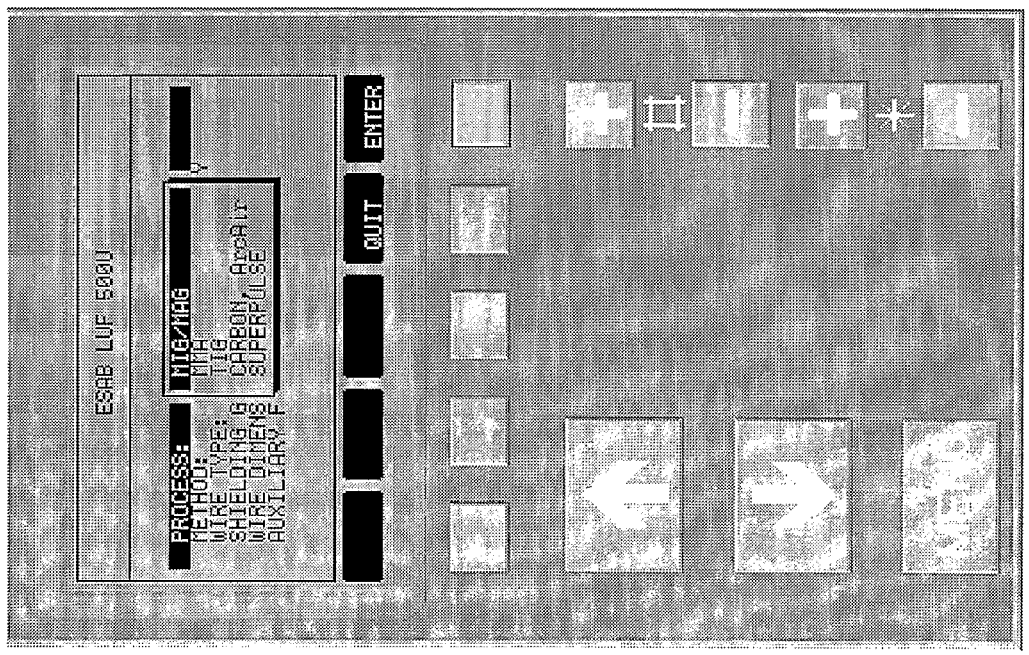

FIG. 5 shows a control panel where SUPERPULSE can be selected as the method.

Figure 6:
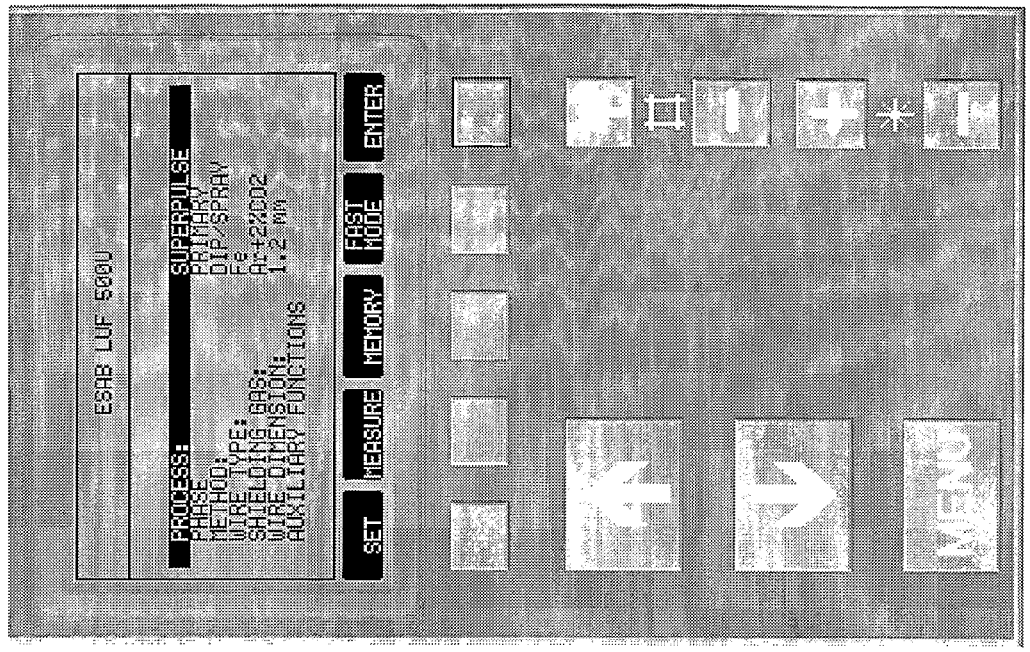
FIGS. 5-8 show examples of how the setting procedure for the invention can be designed.

FIG. 6 shows the choices that can be made in this embodiment when SUPERPULSE has been selected, for instance primary or secondary phase can be selected.

Figure 7:
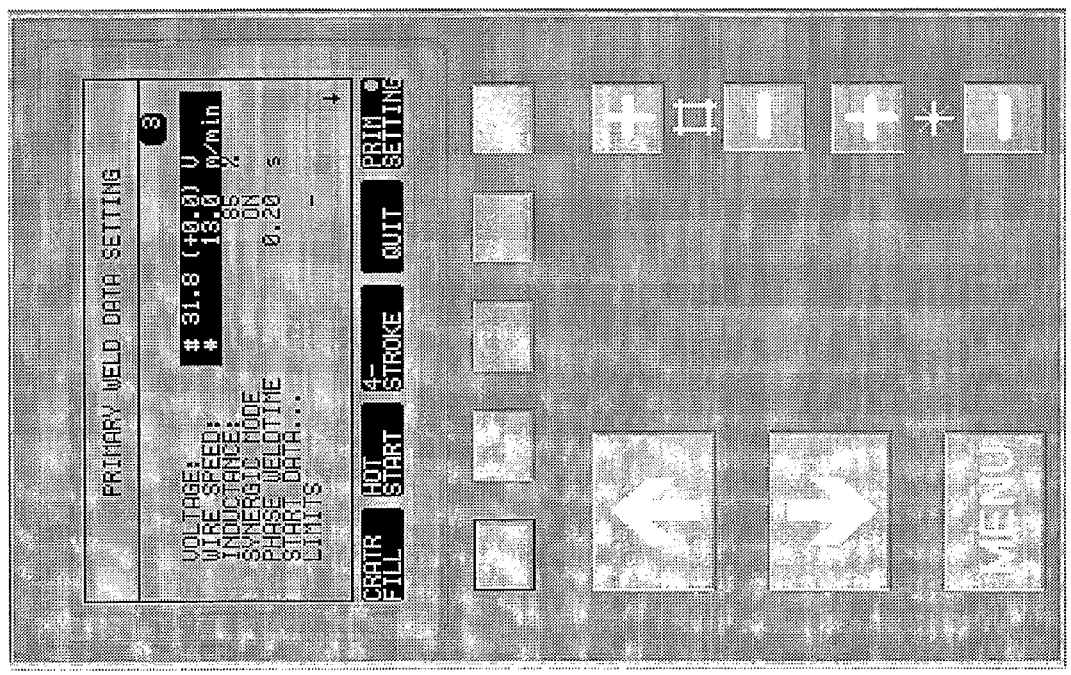
Figure 9:
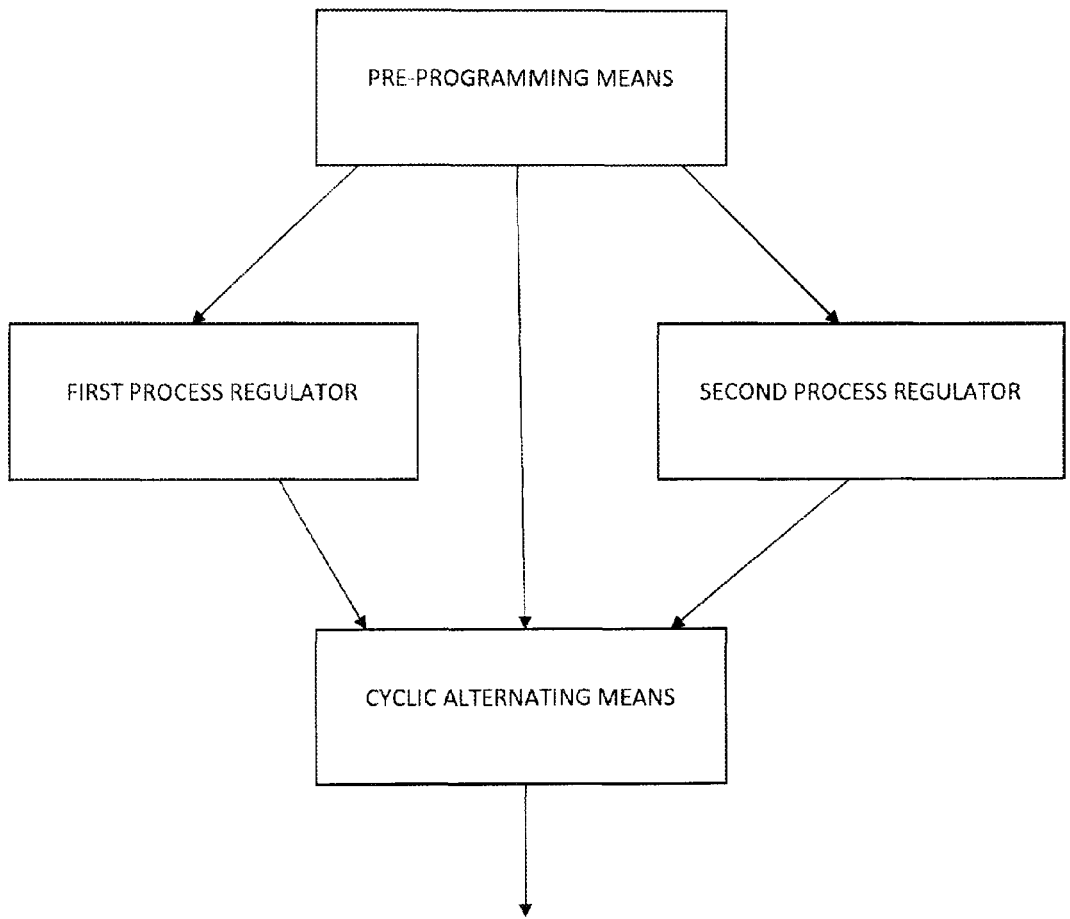
FIG. 9 shows an exemplary arrangement of a pre-programming means, a first process regulator, a second process regulator, and a cyclic alternating means, according to the disclosure.

FIG. 7 shows how the primary phase is programmed as spray arc mode in this case. The synergic mode means that the machine itself suggests suitable parameters on the basis of an entered wire feed speed. The weld time for this phase, and also for the secondary phase, can be programmed from 25 ms to 1000 ms.

Figure 8:
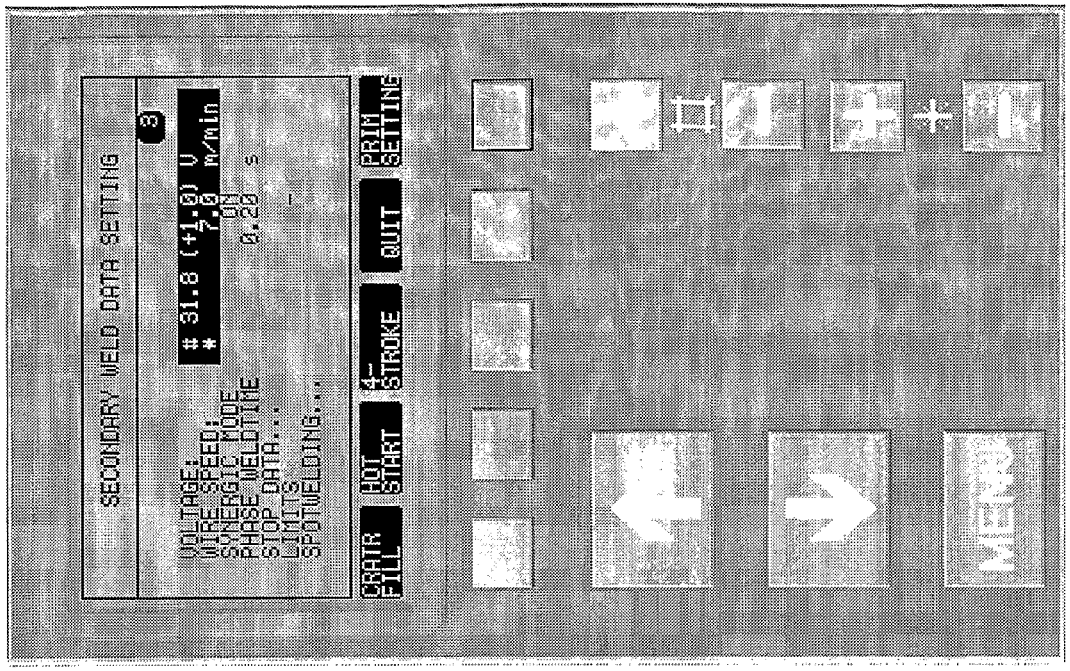

FIG. 8 shows how the secondary mode has been programmed as short pulsing where the machine's synergic choice of voltage is 31.8 V for the entered wire feed rate of 7 m/min. An addition of 1.0 V over and above the synergic choice has been programmed. If the synergic mode had not been selected, a large number of parameters such as pulse time, pulse amplitude, gradient of pulse edges, etc, would have had to be entered manually and the menus for primary phase and secondary phase would have differed in considerably more respects. In the example, only the parameter 'inductance' shows that the primary phase relates to spray arc mode.

The welding now alternates in a regulated way between two phases, one phase consisting of short pulsing and the other phase consisting of either short arc or spray arc welding. This means that while welding is in progress, the process changes from one process regulator to one of a completely different type without the arc being intentionally extinguished in between. This method has had extremely good results regarding insensitivity to the influence of parameters. It is therefore now possible to weld vertical V-joints in, for example, aluminium with a thickness of up to 10 mm without carrying out any weaving motion. In the root run, pulsing is used between short arc and short pulsing and for the sealing run, pulsing is used between spray arc and short pulsing. The back of the joint has the required convex shape without a backing bar being used. The method has proved to have dramatic advantages regarding both quality and productivity, while at the same time the welding is much simpler to carry out.

The pulse and pause times are programmed in the range 25-1000 ms, preferably 50-300 ms.

The invention can be realized in software or hardware, depending upon how the welding process regulators involved are implemented.

What is claimed is:

1. A welding method for gas metal arc welding with continuous electrode feeding, comprising the steps of
conducting spray arc welding,
conducting short pulsing welding for separating off essentially one droplet per pulse,
during a continuous welding run, alternating cyclically between the short pulsing welding and spray arc welding without intentionally extinguishing the arc in between the short pulsing welding and spray arc welding, wherein the alternating cyclically between the short pulsing welding and the spray arc welding is performed during a sealing run; and
alternating cyclically between a short art welding and the short pulsing welding during a root run.

2. The welding method as claimed in claim 1, comprising determining the duration or time for the pulsing by a frequency for cyclic alternating between the short pulsing welding and spray arc welding which are preprogrammed.

3. A welding power source for MIG/MAG welding comprising
a first process regulator initiating and controlling spray arc welding,
a second process regulator for initiating and controlling short pulsing welding for separating off essentially one droplet per pulse,
means for alternating cyclically between the spray arc welding and short pulsing welding during a continuous welding run, and
means for alternating cyclically between a short art welding and the short pulsing welding during a root run, and alternating cyclically between the spray arc welding and the short pulsing welding during a sealing run.

4. The welding power source as claimed in claim 3, wherein the means comprises a timer settable for durations or times of 25 to 1000 ms.

5. The welding power source as claimed in claim 4, wherein the pre-programming means comprises a timer settable for durations or times of 50 to 300 ms.

6. The welding power source as claimed in claim 3, wherein the pre-programming means also comprises a setting device with special support for facilitating programming of a first phase with setting data for parameters of the spray arc welding, and a second phase with setting data for parameters of the short pulsing welding.

7. The welding power source as claimed in claim 6, wherein the pre-programming means also comprises a setting device with special support for facilitating programming of the cyclic alternating between the first and second phases.

8. A control box connectable to a welding source as claimed in claim 3, additionally comprising a setting device with special support for facilitating programming of a first phase with setting data for parameters of the spray arc welding, and a second phase with setting data for parameters of the short pulsing welding.

9. The control box as claimed in claim 8, comprising a setting device with special support for facilitating programming of the cyclic alternating between the first and second phases.

10. A control box connectable to a welding set including a welding power source for MIG/MAG welding comprising
a first process regulator for initiating and controlling spray arc welding,
a second process regulator for initiating and controlling short pulsing welding for separating off essentially one droplet per pulse,
means for alternating cyclically between the spray arc welding and short pulsing welding during a continuous welding run, and means for alternating cyclically between a short art welding and the short pulsing welding during a root run, and for alternating cyclically between the spray arc welding and the short pulsing welding during a sealing run.

11. The control box as claimed in claim 10, comprising a setting device with special support for facilitating programming of the alternating between the first and second phases.

12. The welding power source as claimed in claim 3, wherein said means for cyclically alternating between said short pulsing welding and spray arc welding includes means for determining the duration or time for the pulsing based upon frequency for cyclic alternating between the pre-programmed short pulsing welding and spray arc welding.

13. The welding method as claimed in claim 1, wherein said short pulsing welding is conducted by periodically increasing welding current to a pulse current of size and length so that current density in a welding electrode creates sufficient electromagnetic force to separate off one droplet per pulse.

14. The welding method as claimed in claim 13, wherein the welding current forms a bell curve about background current for each pulse, with the droplet separating at a peak current value for each pulse.

15. The welding power source as claimed in claim 3, wherein said second process regulator controls said short pulsing welding by periodically increasing welding current to a pulse current of size and length such that current density in a welding electrode creates sufficient electromagnetic force to separate off one droplet per pulse.

16. The welding power source as claimed in claim 15, wherein said second process regulator controls the welding current to form a bell curve about background current for each pulse, with the droplet separating at a peak current value for each pulse.

17. The welding method as claimed in claim 1, additionally comprising the step of
welding vertical V-joints in aluminum or stainless steel material 5-10 mm. thick without weaving.

18. The control box as claimed in claim 3, additionally comprising means for welding vertical V-joints in aluminum or stainless steel material 510 mm. thick without weaving.

19. The welding method as claimed in claim 1, additionally comprising the step of pre-programming a predefined amount of time for performing at least one of the short pulsing welding and spray arc welding prior to commencement of welding.

20. The welding power source as claimed in claim 3, further comprising means for pre-programming a predefined amount of time for performing each of said short pulsing welding and spray arc welding prior to commencement of welding.

21. The control box as claimed in claim 10, further comprising means for pre-programming a predefined amount of time for performing each of said short pulsing welding and spray arc welding prior to commencement of welding.

* * * * *